United States Patent
Wei et al.

(10) Patent No.: US 10,199,931 B2
(45) Date of Patent: Feb. 5, 2019

(54) DEVICE AND METHOD FOR HYBRID FEEDBACK CONTROL OF A SWITCH-CAPACITOR MULTI-UNIT VOLTAGE REGULATOR

(71) Applicant: President and Fellows of Harvard College, Cambridge, MA (US)

(72) Inventors: Gu-Yeon Wei, Boston, MA (US); Tao Tong, Cambridge, MA (US); David Brooks, Cambridge, MA (US); Saekyu Lee, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 15/553,287

(22) PCT Filed: Feb. 26, 2016

(86) PCT No.: PCT/US2016/019738
§ 371 (c)(1),
(2) Date: Aug. 24, 2017

(87) PCT Pub. No.: WO2016/138361
PCT Pub. Date: Sep. 1, 2016

(65) Prior Publication Data
US 2018/0019668 A1 Jan. 18, 2018

Related U.S. Application Data

(60) Provisional application No. 62/121,614, filed on Feb. 27, 2015.

(51) Int. Cl.
*H02M 3/18* (2006.01)
*H02M 3/07* (2006.01)
(Continued)

(52) U.S. Cl.
CPC .............. *H02M 3/07* (2013.01); *G05F 1/10* (2013.01); *H02M 3/156* (2013.01); *H02M 2003/077* (2013.01)

(58) Field of Classification Search
CPC ...... H02M 3/07; H02M 3/1584; H02M 1/088; H02M 2003/75; H02M 3/155; H03F 3/04
(Continued)

(56) References Cited

U.S. PATENT DOCUMENTS 5,717,319 A * 2/1998 Jokinen ................... G05F 1/577
323/269
8,212,541 B2 * 7/2012 Perreault ................. H02M 3/07
323/282
(Continued)

OTHER PUBLICATIONS

International Search Report and Written Opinion for PCT/US16/19738, dated Jul. 12, 2016.

*Primary Examiner* — Rajnikant Patel
(74) *Attorney, Agent, or Firm* — Peter A. Nieves; Sheehan Phinney Bass & Green PA (57) ABSTRACT

A device and method for hybrid feedback control of a switch-capacitor multi-unit voltage regulator are presented. A multi-unit switched-capacitor (SC) core includes a plurality of SC converter units, each unit with a capacitor and a plurality of switches controllable by a plurality of switching signals. Power switch drivers provide a switching signal to each SC converter unit. A secondary proactive loop circuit includes a feedback control circuit configured to control one or more of the plurality of switches. A comparator is configured to compare the regulator output voltage with a reference voltage and provide a comparator trigger signal. Ripple reduction logic is configured to receive the comparator trigger signal and provide an SC unit allocation signal. A multiplexer is configured to receive a first clock signal, a
(Continued)

second clock signal, and the SC unit allocation signal and provide a signal to the power switch drivers.

16 Claims, 7 Drawing Sheets

(51) Int. Cl.
*G05F 1/10* (2006.01)
*H02M 3/156* (2006.01)

(58) Field of Classification Search
USPC ..... 323/264, 266, 271, 282–299; 363/16–20, 363/21.02, 21.04, 59, 60, 62, 124
See application file for complete search history.

(56) References Cited

U.S. PATENT DOCUMENTS

| | | | |
|---|---|---|---|
| 9,048,727 B2 * | 6/2015 | Giuliano | H02M 3/07 |
| 9,143,032 B2 * | 9/2015 | Le | H02M 3/156 |
| 9,444,324 B2 * | 9/2016 | Lee | H02M 1/38 |
| 2004/0095117 A1 | 5/2004 | Kernahan et al. | |
| 2009/0072800 A1 * | 3/2009 | Ramadass | H02M 3/07 |
| | | | 323/271 |
| 2011/0304306 A1 | 12/2011 | Galal et al. | |
| 2012/0025799 A1 | 2/2012 | Tournatory et al. | |
| 2014/0306648 A1 | 10/2014 | Le et al. | |
| 2015/0008894 A1 | 1/2015 | Cannankurichi et al. | |

* cited by examiner

DEVICE AND METHOD FOR HYBRID FEEDBACK CONTROL OF A SWITCH-CAPACITOR MULTI-UNIT VOLTAGE REGULATOR

CROSS-REFERENCE TO RELATED APPLICATIONS

This application claims the benefit of U.S. Provisional Patent Application Ser. No. 62/121,614, filed Feb. 27, 2015, entitled "Hybrid Feedback Control of a Switch-Capacitor Multi-Unit Voltage Regulator," which is incorporated by reference herein in its entirety.

STATEMENT REGARDING FEDERALLY SPONSORED RESEARCH OR DEVELOPMENT

This invention was made with Government support under National Science Foundation contract number CCF-0926148 and National Science Foundation contract number CCF-1218298. The Government has certain rights in the invention.

FIELD OF THE INVENTION

The present invention relates to electronic circuitry, and more particularly, is related to a voltage regulator.

BACKGROUND OF THE INVENTION

Figure 1:
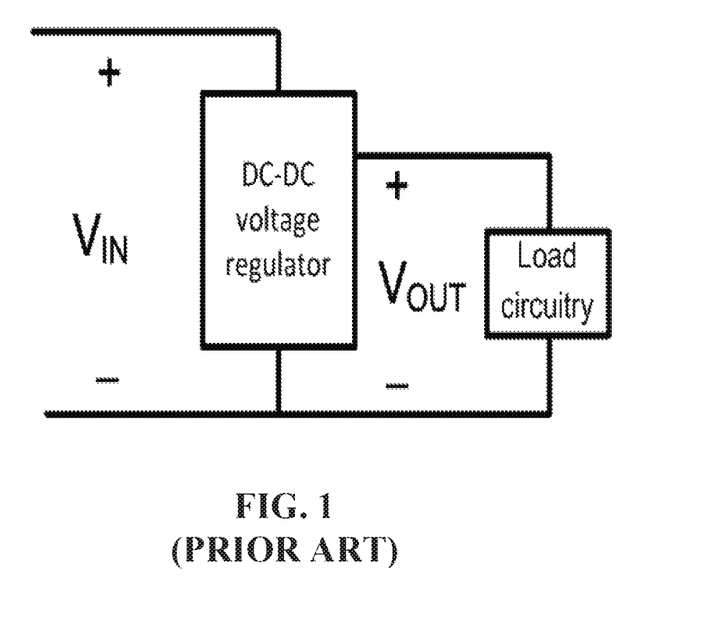
FIG. 1 is a schematic diagram of a prior art DC-DC voltage regulator.

A voltage regulator is a power supply that provides one or more regulated output voltages from an input voltage. In a DC-DC voltage regulator, both the input and output voltages are direct current (DC) voltages, as shown in FIG. 1. A conversion ratio, defined as $V_{IN}/V_{OUT}$, is one of the most important specifications of the regulator. If $V_{IN}/V_{OUT}$ is larger than 1, the voltage regulator is usually called a step-down converter. On the other hand, if $V_{IN}/V_{OUT}$ is smaller than 1, voltage regulator is called a step-up converter. The load circuitry could be any device or devices that consume electric power, such as processor chips, a display, and so on.

A switched-capacitor (SC) DC-DC converter is a commonly used DC-DC voltage regulator. The core circuitry of an SC converter is composed of capacitors and switches that are connected together in a variety of different ways. By switching one or more of the switches on and off in certain patterns, the electric energy is delivered from input to output.

Figure 2:
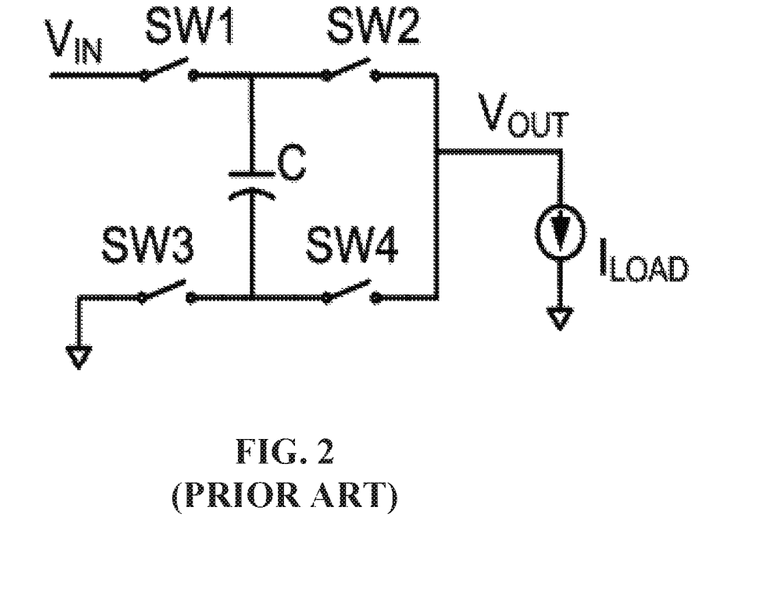
FIG. 2 is a schematic diagram of a prior art 2-to-1 SC DC-DC converter.
Figure 3:
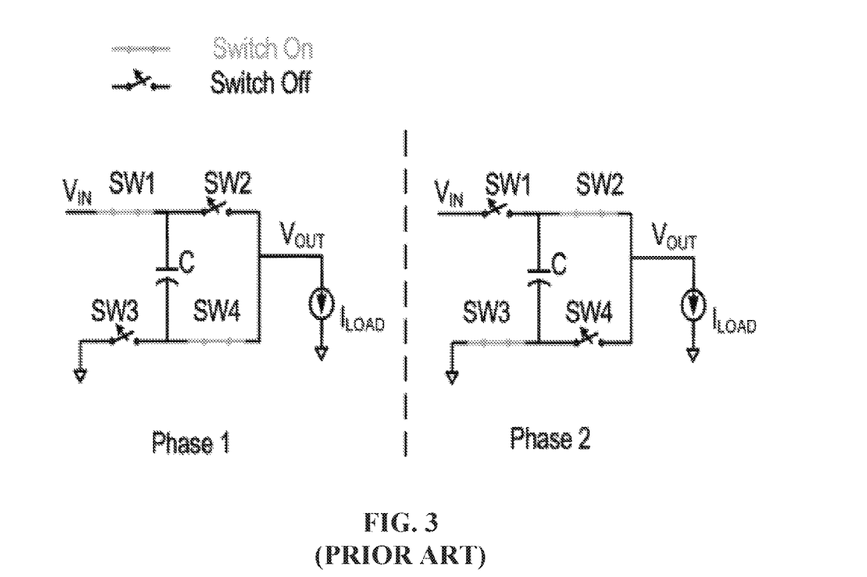
FIG. 3 is a schematic diagram of a prior art two-phase operation of a 2-to-1 SC DC-DC converter.

FIG. 2 shows an example of a prior art 2-to-1 SC converter. As suggested by its name, the conversion ratio of this converter is 2-to-1. This 2-to-1 SC converter consists of one capacitor C and four switches SW1-SW4. This 2-to-1 SC converter, as well as most typical SC converters, works in a 2-phase operation. The operation of the 2-to-1 SC converter of FIG. 2 is illustrated in FIG. 3. During phase 1, switch 1 SW1 and switch 4 SW4 are turned ON (closed), and switch 2 SW2 and switch 3 are turned OFF (open). In phase 1, the capacitor C is connected between the input $V_{IN}$ and the output $V_{OUT}$. The voltage across the capacitor C increases as the capacitor is charged. During phase 2, switch 1 SW1 and switch 4 SW4 are turned OFF (open), and switch 2 SW2 and switch 3 are turned ON (closed). In phase 2, the capacitor C is connected between $V_{OUT}$ and ground. The voltage across the capacitor C decreases as the capacitor C is discharged. Energy is transferred from the input $V_{IN}$ to the output $V_{OUT}$ through the charging/discharging of the capacitor C. On average, the voltage across the capacitor C is about $V_{IN}/2$, creating a conversion ratio about 2-to-1.

Figure 4A:
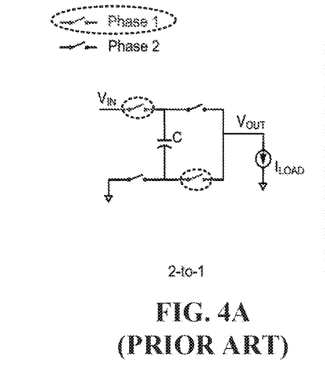
FIG. 4A is a schematic diagram depicting an exemplary prior art 2:1 converter.
Figure 4B:
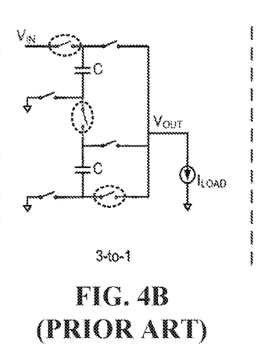
FIG. 4B is a schematic diagram depicting an exemplary prior art 3:1 converter.
Figure 4C:
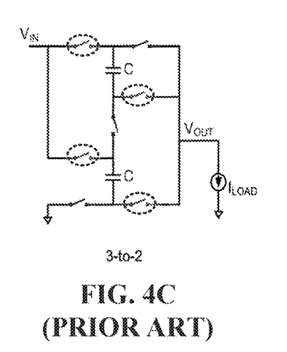
FIG. 4C is a schematic diagram depicting an exemplary prior art 3:2 converter.

Different configurations of the capacitors and switches may result in different conversion ratios. FIGS. 4A-4C show three exemplary converters, each having a different conversion ratio. The phase 1 switches are depicted as being enclosed by a dashed oval, while the phase 2 switches are not enclosed. FIG. 4A depicts an exemplary 2:1 converter. FIG. 4B depicts an exemplary 3:1 converter. FIG. 4C depicts an exemplary 3:2 converter. It is also important to notice that different configurations of capacitors and switches may achieve the same conversion ratio. This creates different topologies of SC converters. There are advantages and disadvantages for each topology, making different topologies suitable for different applications. But fundamentally, the manner in which the capacitors and switches are connected together and the switching pattern of the switches define the characteristics of the SC converter.

Figure 5A:
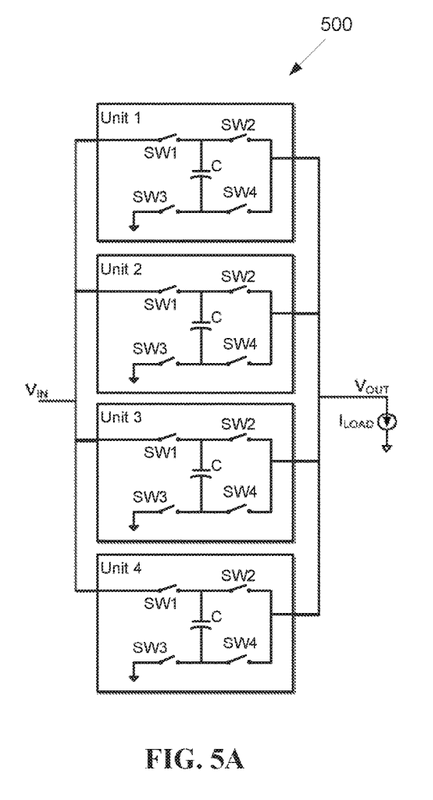
FIG. 5A is a circuit diagram of an exemplary embodiment of a 4-unit 2-to-1 SC converter.
Figure 5B:
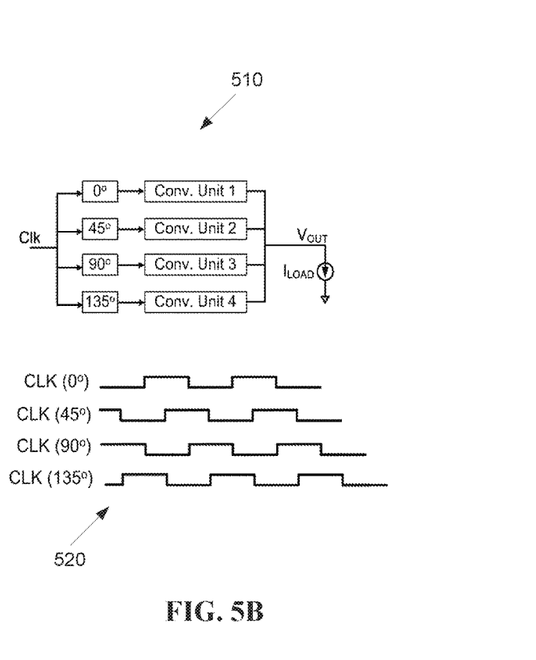
FIG. 5B is an interleaved clocking diagram of the exemplary embodiment of the 4-unit 2-to-1 SC converter of FIG. 5A.

In most SC converters, the capacitor-switch switching cell is broken into multiple small unit cells. This is a well-known and well-accepted design method. These converters are usually called multi-unit or multi-phase converters, and the individual unit cells may be referred to as ladder units. FIG. 5A shows an exemplary multi-unit 2-to-1 SC converter 500 that has 4 unit cells. FIG. 5B shows a schematic diagram of power switch drivers 510 configured to control the switches of the converter 500, and an interleaved clocking diagram 520 for the converter of FIG. 5A. The advantage of a multi-unit converter 500 over a single unit converter (see FIG. 2) is that only one unit may switch at a time, while the capacitors in all other units serve as filters if not switching. This reduces the current/voltage noise created by the switching behavior of the converter 500.

A primary function of a DC-DC converter is to deliver a certain amount of power from input to output at a reference output voltage. So the converter usually uses feedback control logic to make sure that it delivers the right amount of power and creates the correct output voltage. A feedback control logic usually monitors the output voltage/current of the converter, and adjusts the behavior, such as switching frequency, of the converter to meet the application requirements.

Figure 6:
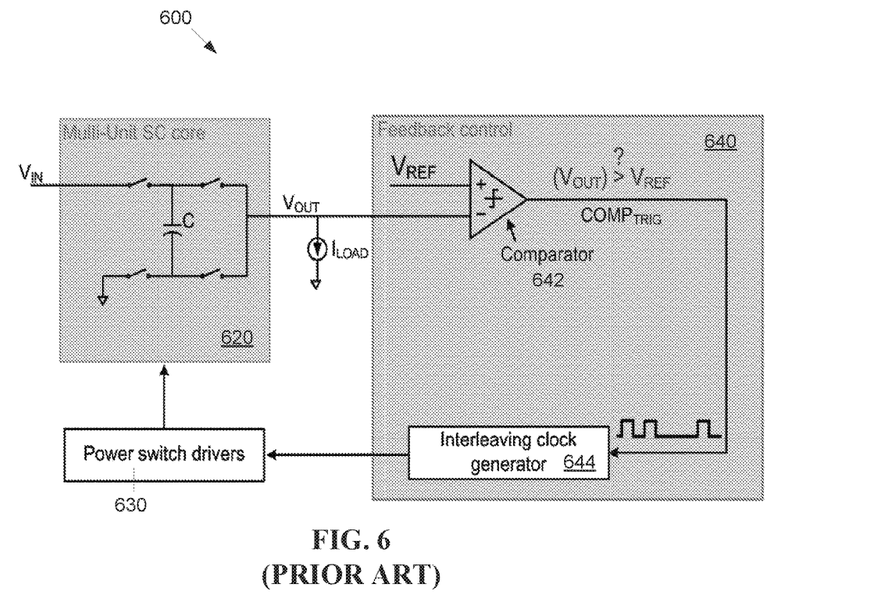
FIG. 6 is a schematic diagram showing an exemplary embodiment of a 2-to-1 SC converter with single-bound feedback control loop.

FIG. 6 illustrates the concept of the well-known single-bound feedback control logic circuit 600. A clocked comparator 642 monitors a output voltage, $V_{OUT}$, of the converter 620. $V_{OUT}$ is compared to a reference voltage, $V_{REF}$, at the edge of the clock. If $V_{OUT}$ is higher than $V_{REF}$, it means the converter 620 delivers more power than the reference voltage. Or if $V_{OUT}$ is lower than $V_{REF}$, the converter 620 does not deliver enough power. If $V_{OUT}$ is greater than $V_{REF}$, the converter 620 is not switching, and $V_{OUT}$ is discharged by a load current $I_{LOAD}$. When $V_{OUT}$ is detected to be lower than $V_{REF}$, a pulse is created, namely $COMP_{TRIG}$, which is the output of the comparator 642, and the interleaving clock generator 644 provides a feedback path causing the power switch drivers 630 to signal one of the SC units in the converter 620 switch to deliver more power to the output $V_{OUT}$. So the feedback logic changes $V_{OUT}$ and the amount of power being delivered. It is named single-bound control mainly because there is only one reference voltage $V_{REF}$ used in the feedback implementation.

Figure 7:
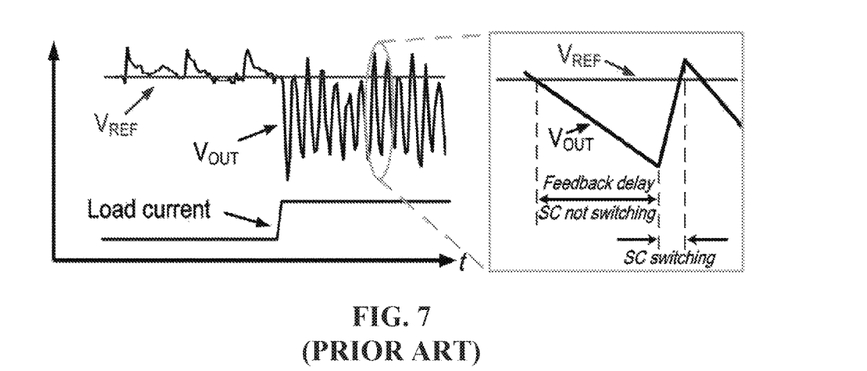
FIG. 7 is a plot showing a typical transient waveform of an SC converter with single-bound control.

FIG. 7 shows the transient output waveform of an SC converter that solely relies on single-bound control. At heavy load conditions (when load current is high), the load current quickly discharges $V_{OUT}$ before the feedback loop can detect and react, creating large voltage ripple. Therefore, there is a need in the industry to address one or more of the abovementioned shortcomings.

SUMMARY OF THE INVENTION

Embodiments of the present invention provide a device and method for hybrid feedback control of a switch-capacitor multi-unit voltage regulator. Briefly described, the present invention is directed to a multi-unit switched-capacitor (SC) core including a plurality of SC converter units, each unit with a capacitor and a plurality of switches controllable by a plurality of switching signals. Power switch drivers provide a switching signal to each SC converter unit. A secondary proactive loop circuit includes a feedback control circuit configured to control one or more of the plurality of switches. A comparator is configured to compare the regulator output voltage with a reference voltage and provide a comparator trigger signal. Ripple reduction logic is configured to receive the comparator trigger signal and provide an SC unit allocation signal. A multiplexer is configured to receive a first clock signal, a second clock signal, and the SC unit allocation signal and provide a signal to the power switch drivers.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

As noted in the Background section, an SC converter that solely relies on single-bound control may result in a large output ripple in the transient output waveform during heavy load conditions. In exemplary embodiments of the present invention, a single-bound control loop may be supplemented with a secondary proactive loop to reduce voltage ripple during heavy load conditions. As shown by FIG. 8B, the secondary proactive loop 840 differs from the single-bound control loop (FIG. 6) by the addition of a multiplexer (MUX), an additional interleaving clock generator 841, and ripple reduction logic 810. This difference may be seen by comparing FIG. 6 to FIG. 8B. Under the first embodiment, the SC switching units of a multi-unit SC core 820 are divided into a first subset 821 (FIG. 8C) of proactive units and a second subset 822 (FIG. 8C) of single-bound units. The first subset 821 is depicted in FIG. 8C by three SC units within a dashed line, and the second subset 822 is depicted by three SC units within a dot-dashed line.

Returning to FIG. 8B, by detecting load conditions, the secondary proactive loop 840 of the first embodiment tells the first subset 821 of the SC switching units of the multi-unit SC core 820 to always switch at a predetermined frequency, provided by a first interleaving clock generator 841. The predetermined frequency generally corresponds to the highest switching frequency selected to provide sufficient power to load, as is determined according to the application at hand. Because of these constantly switching units in the first subset 821 (FIG. 8C), the load current discharges $V_{OUT}$ more slowly than the second subset 822 (FIG. 8C) having only single-bound control, thereby reducing voltage ripple during heavy load times.

For simplicity, FIG. 8B only depicts a single exemplary SC unit of the multi-unit SC core 820. However, the multi-unit SC core 820 includes multiple SC units. Under the first embodiment, the multi-unit SC core 820 may be similar to the multi-unit SC core 500 shown in FIG. 5A, and the power switch drivers 830 may be similar to the power switch drivers 510 shown in FIG. 5B. For example, FIG. 8C shows a multi-unit SC core 820 having six SC units. While FIG. 8C depicts a multi-unit converter having six units, in alternative embodiments a multi-unit converter may have two, three, four, five, seven, or more SC units, with each SC unit having an independent clock signal phased to evenly time the switching of the corresponding SC units. While each of the SC units may be topologically identical and may be individually controlled by interleaved switching signals, in alternative embodiments the individual SC units may be implemented with different topologies, and may be either individually switch, or switched in sub-groups.

Figure 8A:
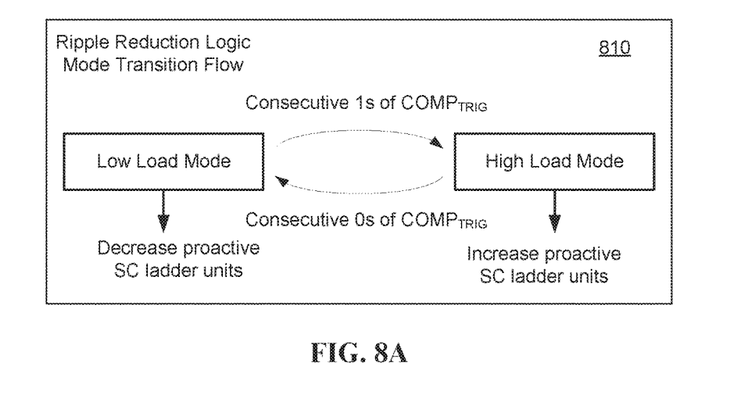
FIG. 8A is a logic diagram illustrating ripple reduction logic of a first embodiment of an exemplary hybrid feedback control.
Figure 8B:
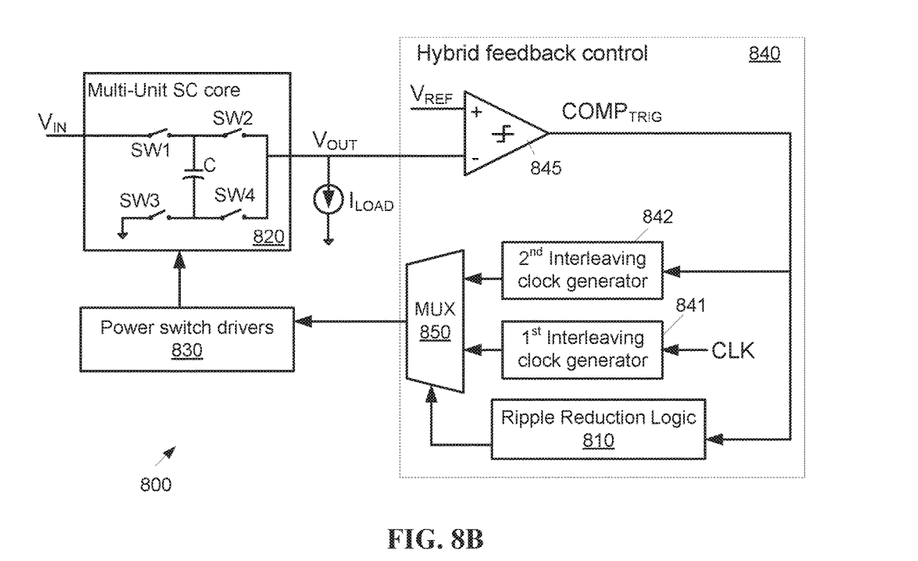
FIG. 8B is a schematic diagram illustrating an implementation of the first embodiment of an exemplary hybrid feedback control.
Figure 8C:
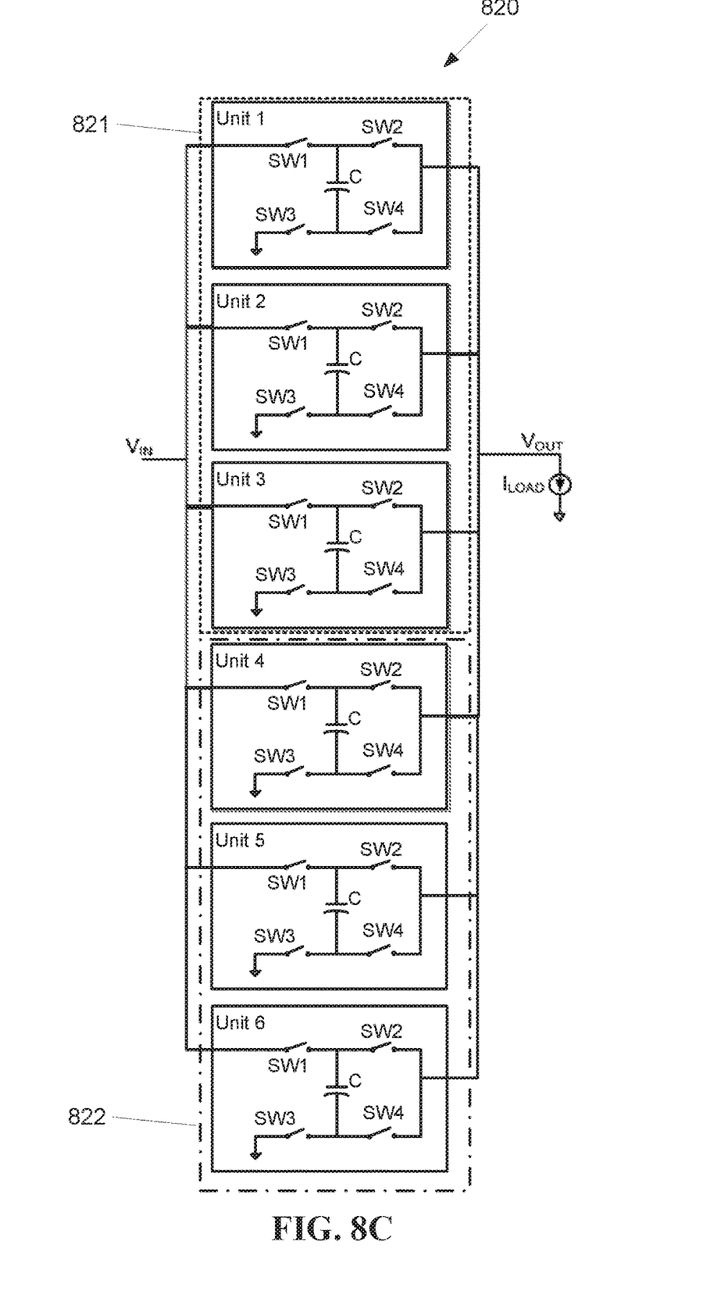
FIG. 8C is a schematic diagram illustrating a detail of an exemplary a multi-unit SC core having six SC units.

A first exemplary embodiment of a switch-capacitor multi-unit voltage regulator with hybrid feedback control is shown in FIGS. 8A-8B. The circuit 800 includes the multi-unit SC core 820, power switch drivers 830 configured to control the switches of the multi-unit SC core 820, and a secondary loop including a hybrid feedback control circuit 840. The comparator 845 compares the output signal $V_{OUT}$ of the multi-unit SC core 820 to a reference voltage $V_{REF}$, and produces an output signal $COMP_{TRIG}$. The output signal $COMP_{TRIG}$ may be a binary signal, for example, where first voltage level represents a logical 1, and a second voltage level represents a logical 0. A logical 1 in the output signal $COMP_{TRIG}$ indicates $V_{REF}$ is greater than $V_{OUT}$, and a logical 0 in the output signal $COMP_{TRIG}$ indicates $V_{REF}$ is less than $V_{OUT}$.

The output signal $COMP_{TRIG}$ of the comparator 845 may be fed as an input to a second interleaving clock generator 842, and to the ripple reduction logic 810. The first interleaving clock generator 841 may be clocked separately from the second interleaving clock generator 842. The first interleaving clock generator 841 generates the predetermined maximum switching frequency for the first subset 821 (FIG. 8C) of the SC switching units. A MUX 850 receives inputs from the first interleaving clock generator 841, the second interleaving clock generator 842, and the ripple reduction logic 810. The output of the MUX 850 may be fed to the input of the power switch drivers 830.

The MUX 850 provides a first switching signal component provided by the first interleaving clock generator 841 to the power switch drivers 830. The first switching signal component causes the first subset 821 (FIG. 8C) of SC units to switch at the predetermined frequency. The MUX 850 provides a second switching signal component provided by the second interleaving clock generator 842 to the power switch drivers 830. The second switching signal component causes the second subset 822 (FIG. 8C) of SC units to switch under single-bound control. The MUX 850 provides a third switching signal component provided by the ripple reduction logic 810. As described further below, the third switching signal component (an SC unit allocation signal) is used to allocate the number of SC units of the multi-unit SC core 820 that are in the first subset 821 (FIG. 8C) and the number of SC units of the multi-unit SC core 820 that are in the second subset 822 (FIG. 8C).

The ripple reduction logic 810 monitors consecutive 1s and 0s in the output signal of the comparator 845 $COMP_{TRIG}$ to dynamically allocate SC ladder units (SC units) within the multi-unit SC core 820 between single-bound and proactive control. An SC core unit in the first subset 821 (FIG. 8C) that receives a switching signal from the secondary proactive loop (the output of the MUX 850 when the secondary proactive loop is used) is also referred to herein as a proactive unit. A 1 in the comparator trigger signal $COMP_{TRIG}$ means that not enough power is being delivered to the output of the SC converter, while a 0 in the comparator trigger signal $COMP_{TRIG}$ means that too much power is being delivered.

The ripple reduction logic 810 performs unit allocation between the first subset 821 (FIG. 8C) and the second subset 822 (FIG. 8C) by doing the following. If several consecutive 1s are detected in the comparator trigger signal $COMP_{TRIG}$, more SC ladder units become proactive units. If several consecutive 0s are detected in the comparator trigger signal $COMP_{TRIG}$, the number of proactive units is reduced. In a very heavy load condition, most of the SC ladder units are proactive units switching at the predetermined frequency, periodically delivering power to the output of the SC converter, reducing the voltage ripple. It should be noted that the number of consecutive 1s or 0s in the comparator trigger signal $COMP_{TRIG}$ that results in action of the ripple reduction logic 810 may be modified according to design. For example, under the first embodiment, three may be the consecutive number of 1s/0s in the comparator trigger signal $COMP_{TRIG}$, while under an alternative embodiment, the number of 1s/0s in the comparator trigger signal $COMP_{TRIG}$ may be five, for example, or another number. The present invention is not intended to be limited by the number of 1s or 0s in the comparator trigger signal $COMP_{TRIG}$ required in the definition of the word consecutive. Instead, the number of consecutive 1s or 0s in the comparator trigger signal $COMP_{TRIG}$ defines how actively the proactive unit behaves.

Initially, the SC converter 800 may start without any units of the multi-unit SC core 820 allocated as proactive units. Then if "A" consecutive 1s are detected, one more units become proactive. If "B" consecutive 0s are detected, the proactive units are reduced by one. Here A and B represent threshold integers, determined by the designer of the SC converter, for example, based on simulation results. Alternatively, different start-up configurations may be used, for example, starting with all units proactive.

The total number of units implemented in the units of the multi-unit SC core 820 typically affects the effectiveness of the hybrid control. Generally, more total units results in finer grain control, which may result in preferable performance.

In some scenarios, all of the units of the SC converter 800 may be proactively switched. For example, if the output voltage $V_{OUT}$ is much lower than the reference voltage $V_{REF}$ because the reference voltage $V_{REF}$ or load current $I_{LOAD}$ suddenly increase, all units may become proactive for a certain amount of time to temporarily deliver more power.

The ripple reduction logic 810 may be, for example, a digital circuit tailored specifically for this application. The ripple reduction logic 810 may be implemented, for example, using MOS transistors sharing a silicon chip with the multi-unit SC core 820. The ripple reduction logic 810 monitors the 1s and 0s in the comparator trigger signal $COMP_{TRIG}$ of the comparator 845. In alternative embodiments, the ripple reduction logic 810 may be implemented in other ways, for example, using off-the-shelf programmable processor chips, such as a field programmable gate array (FPGA), to implement the logic.

Figure 9:
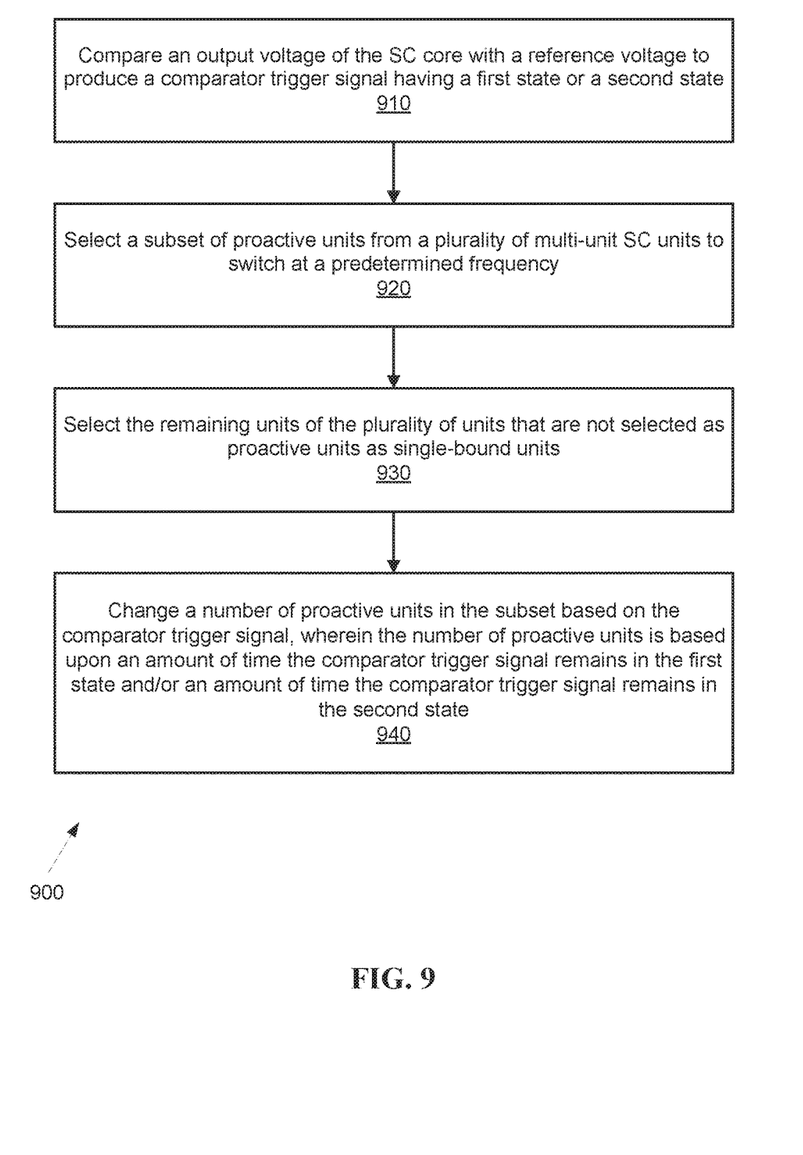
FIG. 9 is a flowchart of a first exemplary embodiment of a method for reducing ripple in a multi-unit SC core voltage regulator having a plurality of SC converter units.

FIG. 9 is a flowchart of a first exemplary embodiment of a method for reducing ripple in a multi-unit SC core voltage regulator having a plurality of SC converter units. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

An output voltage $V_{OUT}$ (FIG. 8B) of a multi-unit SC core 820 (FIG. 8B) is compared with a reference voltage $V_{REF}$ (FIG. 8B) to produce a comparator trigger signal $COMP_{TRIG}$ (FIG. 8B) having a first state or a second state, as shown by block 910. A subset of proactive units from a plurality of the multi-unit SC core 820 (FIG. 8B) units is selected to switch at a predetermined frequency, as shown by block 920. The remaining units of the plurality of units of the multi-unit SC core 820 (FIG. 8B) that are not selected as proactive units are selected as single-bound units, as shown by block 930. The number of proactive units in the subset is changed based on the comparator trigger signal $COMP_{TRIG}$ (FIG. 8B), wherein the number of proactive units is based upon an amount of time the comparator trigger signal $COMP_{TRIG}$ (FIG. 8B) remains in the first state and/or an amount of time the comparator trigger signal $COMP_{TRIG}$ (FIG. 8B) remains in the second state, as shown by block 940.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A voltage regulator configured to receive an input voltage and regulate an output voltage, comprising:
    a multi-unit switched-capacitor (SC) core comprising:
        a plurality of SC converter units, each unit comprising a capacitor and a plurality of switches controllable by a plurality of switching signals; and
        power switch drivers configured to provide a switching signal from the plurality of switching signals to each corresponding SC converter unit; and
    a secondary proactive loop circuit comprising:
        a feedback control circuit in electrical communication with the multi-unit SC core output voltage configured to control one or more of the plurality of switches of one or more of the plurality of units, further comprising:
            a comparator configured to compare the output voltage with a reference voltage and provide a comparator trigger signal;
            a first control loop comprising a first clock generator providing a first clock signal;
            a second control loop comprising a second clock generator configured to receive the comparator trigger signal and provide a second clock signal and ripple reduction logic configured to receive the comparator trigger signal and provide an SC unit allocation signal; and
            a multiplexer (MUX) configured to receive three switching signals comprising the first clock signal, the second clock signal, and the SC unit allocation signal and to provide a MUX signal derived from the three switching signals to the power switch drivers.

2. The voltage regulator of claim 1, wherein the SC unit allocation signal is configured to allocate a first subset of the plurality of SC converter units as proactive units.

3. The voltage regulator of claim 2, wherein the number of SC converter units allocated to the first subset of SC converter units is determined by the SC unit allocation signal.

4. The voltage regulator of claim 2, wherein the first clock signal is configured to switch the first subset of SC converter units at a predetermined frequency.

5. The voltage regulator of claim 1, wherein the trigger signal consists of a first state and a second state.

6. The voltage regulator of claim 5, wherein the ripple reduction logic is configured to detect an amount of time the comparator trigger signal remains in the first state and/or an amount of time the comparator trigger signal remains in the second state.

7. The voltage regulator of claim 6, wherein the amount of time the comparator trigger signal remains in the first state and/or an amount of time the comparator trigger signal remains in the second state is compared to a threshold, and a state of the SC unit allocation signal is determined based upon whether or not the threshold is passed.

8. The voltage regulator of claim 7, wherein the threshold is configurable.

9. The voltage regulator of claim 1, wherein
    the first clock generator is configured to provide the first clock signal at a predetermined frequency.

10. The voltage regulator of claim 1, wherein each switching signal of the plurality of switching signals is clocked with a different clock phase.

11. A method for reducing ripple in a multi-unit switched-capacitor (SC) core voltage regulator comprising a plurality of SC converter units, comprising the steps of:
    comparing an output voltage of the SC core with a reference voltage;
    producing a comparator trigger signal comprising a first state and a second state;
    selecting a first subset of proactive units from the plurality of units to switch at a predetermined frequency;
    selecting the remaining units of the plurality of units that are not selected as proactive units as a second subset of single-bound units; and
    changing a number of proactive units in the first subset based on the comparator trigger signal,
    wherein the number of proactive units is based upon an amount of time the comparator trigger signal remains in the first state and/or an amount of time the comparator trigger signal remains in the second state.

12. The method of claim 11, further comprising the step of setting the comparator trigger signal to the first state when the reference voltage is greater than the SC core output voltage, and setting the comparator trigger signal to the second state when the reference voltage is lower than the SC core output voltage.

13. The method of claim 12, further comprising the step of switching at least one of the single-bound units when the comparator trigger changes from the first state to the second state.

14. The method of claim 11, further comprising the steps of:
    detecting a load condition of the SC core; and
        switching a subset of SC switching units to switch at a predetermined frequency based upon the load condition.

15. A secondary proactive loop circuit configured to control a multi-unit switched-capacitor (SC) core of a voltage regulator, the core comprising a plurality of SC converter units, each unit comprising a capacitor and a plurality of switches controllable by a plurality of switching signals, the core configured to receive an input voltage and regulate an output voltage, the secondary proactive loop circuit comprising:
    a feedback control circuit in electrical communication with the multi-unit SC core output voltage and configured to control one or more of the plurality of switches of one or more of the plurality of units, further comprising:
        a comparator configured to compare the output voltage with a reference voltage and provide a comparator trigger signal;
        a first control loop comprising a first clock generator providing a first clock signal;
        a second control loop comprising a second clock generator configured to receive the comparator trigger signal and provide a second clock signal and ripple reduction logic configured to receive the comparator trigger signal and provide an SC unit allocation signal; and a multiplexer (MUX) configured to receive three switching signals comprising the first clock signal, the second clock signal, and the SC unit allocation signal and to provide a core switching signal derived from the three switching signals to the multi-unit SC core.

16. The secondary proactive loop circuit of claim 15, further comprising:

a first interleaving clock generator configured to provide the first clock signal at a predetermined frequency; and a second interleaving clock generator configured to receive the comparator trigger signal and provide the second clock signal.

* * * * *

UNITED STATES PATENT AND TRADEMARK OFFICE
CERTIFICATE OF CORRECTION

PATENT NO. : 10,199,931 B2  
APPLICATION NO. : 15/553287  
DATED : February 5, 2019  
INVENTOR(S) : Gu-Yeon Wei et al.

Page 1 of 1

It is certified that error appears in the above-identified patent and that said Letters Patent is hereby corrected as shown below:

In the Specification

Column 1, Line 15 Please correct paragraph 2, entitled "Statement Regarding Federally Sponsored Research or Development" to read as follows:
"This invention was made with government support under 1218298 and 0926148 awarded by the National Science Foundation. The government has certain rights in the invention."

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*